United States Patent [19]
Westbrook et al.

[11] Patent Number: 4,763,318
[45] Date of Patent: Aug. 9, 1988

[54] TRANSMISSION AND RECEPTION OF SYNCHRONOUS DATA AND TIMING SIGNALS USING A STEADY BIT STREAM

[75] Inventors: James E. Westbrook, Sylmar; Adolfo B. Suarez, Los Angeles, both of Calif.

[73] Assignee: Datos Corporation, Van Nuys, Calif.

[21] Appl. No.: 859,285

[22] Filed: May 2, 1986

[51] Int. Cl.$^4$ .................................................. H04J 3/16
[52] U.S. Cl. .................................. 370/84; 370/110.1; 370/100
[58] Field of Search ................. 370/100, 84, 91, 110.1, 370/86; 375/106, 110

[56] References Cited

U.S. PATENT DOCUMENTS

| | | | |
|---|---|---|---|
| 4,078,153 | 3/1978 | Moreau | 370/100 |
| 4,377,860 | 3/1983 | Godhole | 370/84 |
| 4,419,739 | 12/1983 | Blum | 375/106 |
| 4,433,424 | 2/1984 | Taber et al. | 375/106 |
| 4,521,883 | 6/1985 | Roché | 375/110 |
| 4,593,389 | 6/1986 | Wurzburg et al. | 370/110.1 |
| 4,612,653 | 9/1986 | Livingston et al. | 375/110 |
| 4,677,614 | 6/1987 | Circo | 370/86 |

*Primary Examiner*—Salvatore Cangialosi
*Attorney, Agent, or Firm*—Lyon & Lyon

[57] ABSTRACT

In an telecommunications switching system, user clock data is "massively sampled" at the source node with reference to a global clock signal, and reconstructed with no more than allowable error at the destination. Massive sampling and reconstruction of the clock signal allows users of the transmission system to send data at arbitrary data rates and to perform their own clock synchronization at a different protocol level from the hardware switching system. Direct use of the global system clock rate of approximately 192 kilobits per second (kbps) is provided for by synchronizing the user data with the global clock signal.

4 Claims, 2 Drawing Sheets

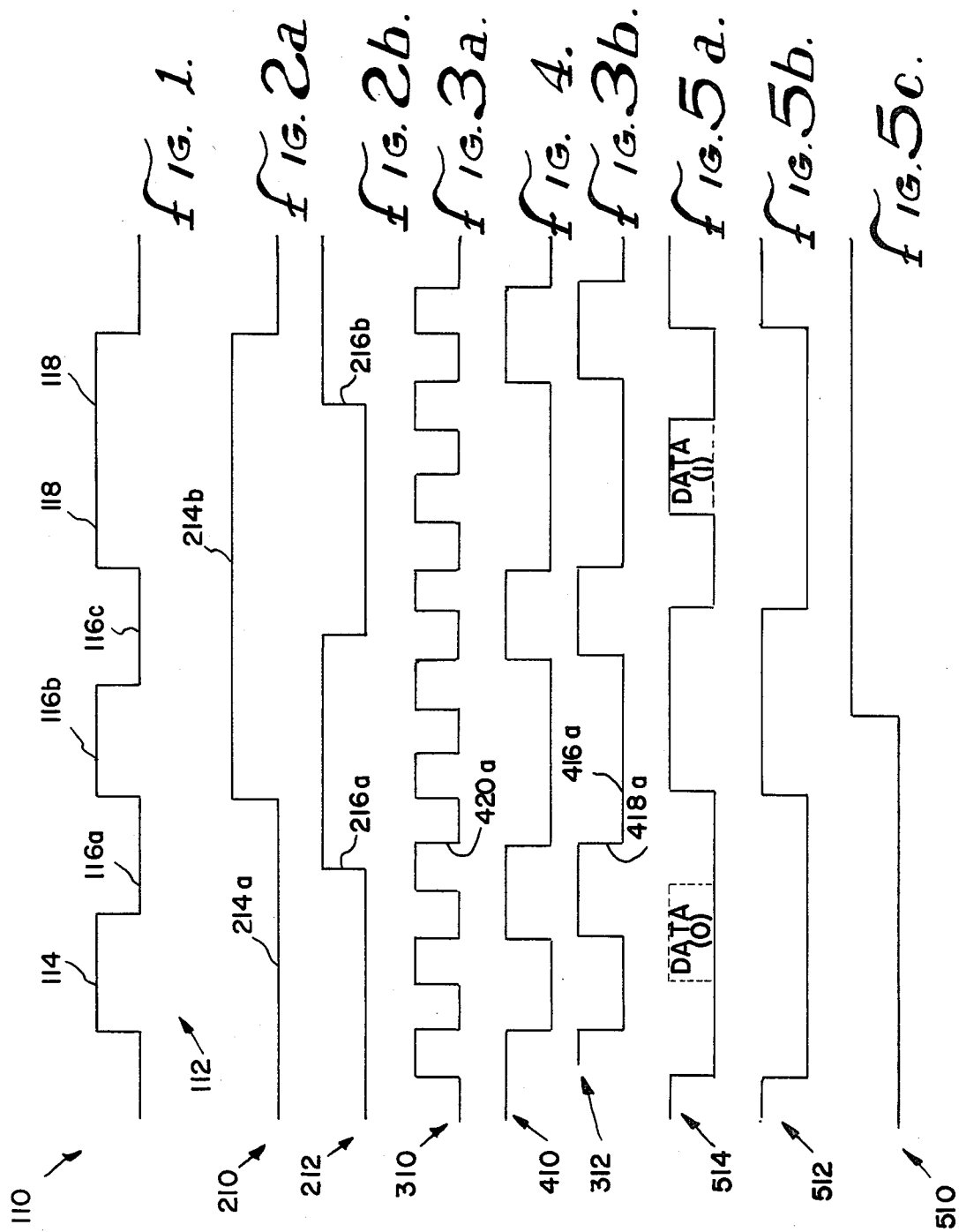

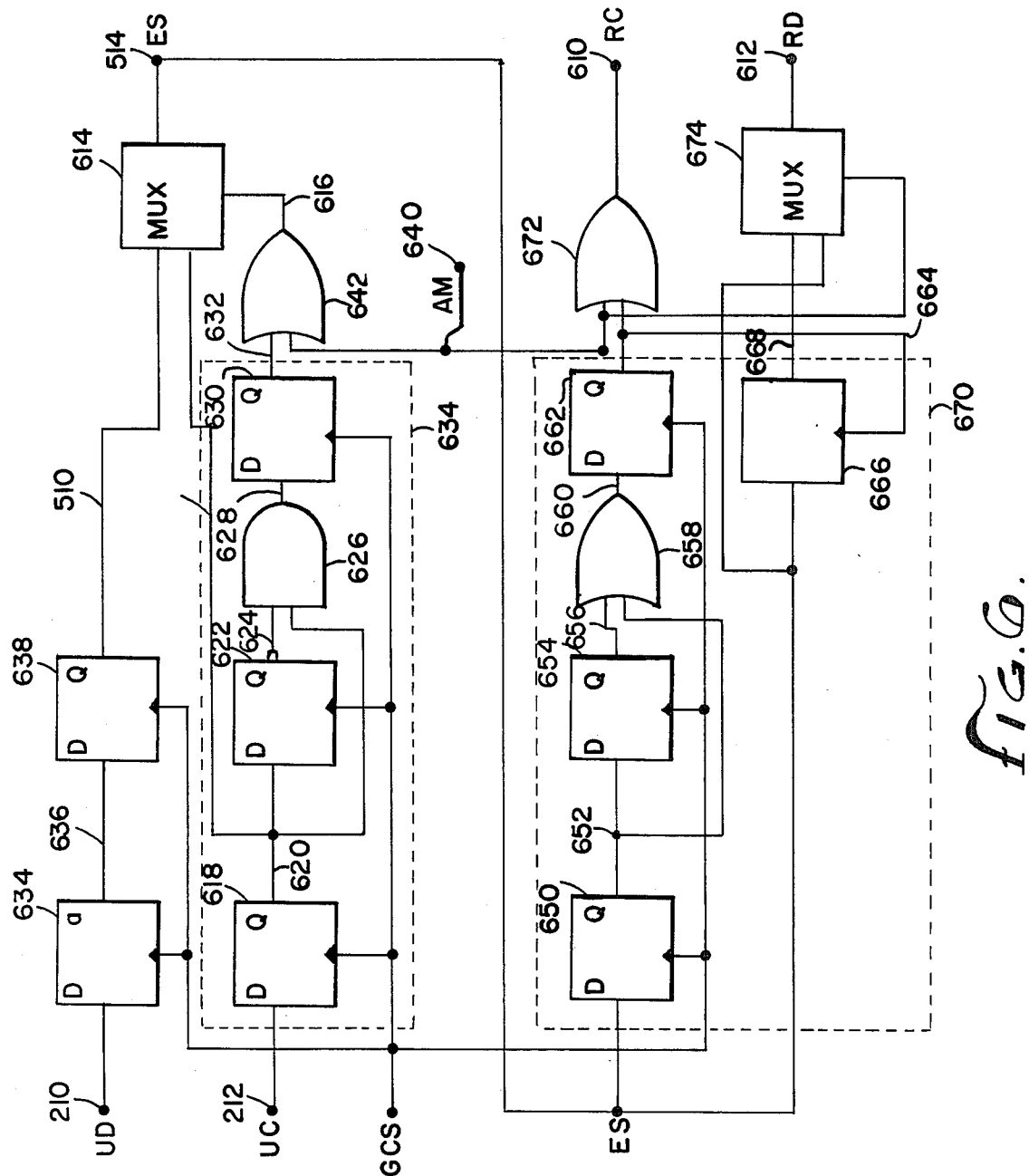

TRANSMISSION AND RECEPTION OF SYNCHRONOUS DATA AND TIMING SIGNALS USING A STEADY BIT STREAM

BACKGROUND OF THE INVENTION

Field of the Invention

The present invention relates to the field of data-over-voice (DOV) transmission of data in telephone switching systems. More specifically, it relates to the field of synchronization of clock timing data for a distributed data transmission system.

General Background

Telecommunications switching systems, which connect individual telephones, carry voice information (data) from station to station. They are generally constructed to carry their data in analog form, using the frequency range from 0-3 KHz. Single-building systems often use twisted-pair or similar quality wiring to carry the data, usually with available frequency ranges of up to about 1.8 MHz. This clearly leaves a great deal of unused spectrum space available for other communication activity, such as carrying digital data. When data is carried over a commlink in the higher frequencies above those allocated to voice, the switching system is said to utilize data-over-voice ("DOV").

Because there are many devices which operate at differing speeds, it is generally desirable to be able to transmit messages through a communication system at speeds which match the application devices. At least two communication methods have been developed for this purpose, known in the art as "synchronous communication" and "asynchronous communication". In general, asynchronous communication relies upon the ability to flag the beginning and ending of valid data, while synchronous communication relies upon the ability to generate and transmit a separate clock signal to indicate the rate at which data bits are transmitted.

In a DOV telecommunication system, there is a problem with transmitting a separate clock signal from device to device within the system. Without the separate clock signal, it is very difficult to transmit data at differing speeds for application devices which operate at those differing speeds. Accordingly, there is a need for a DOV telecommunication system which is able to operate at differing speeds, and which is capable of flexible alteration of its operation from one transmission speed to another.

The Prior Art

One method of the prior art is to transmit data by a method of amplitude modulation, while varying the frequency at which the carrier operates. Thus, the envelope of the carrier carries data, and the carrier frequency itself carries the information about the necessary clock speed. While this method of the prior art accomplishes the object of combining the data and clock signals into one transmission signal, it is subject to several drawbacks.

First, although varying data rates are possible with this method of the prior art, the amount of variation which is possible is generally quite limited. In contrast with this limitation, the present invention is able to transmit synchronous data over a wide range of data rates. Second, this method of the prior art is difficult to use in a switching system and generally requires human intervention to change the data rate. In contrast with this limitation, the present invention is able to alter data rates automatically and by a method which is almost entirely transparent to the central switch.

A second method of the prior art is to queue data in a first-in-first-out ("FIFO") queue and to use a variable oscillator to dequeue the data at the receiver. Thus, a varying input data rate is transformed to a fixed data rate for easy switching, and transformed back at the receiver. While this method of the prior art accomplishes the object of combining the data and clock signals into one transmission signal, it is also subject to several drawbacks.

First, although this method of the prior art transforms varying data rates to a fixed data rate for switching, the amount of variation which is possible is still quite limited. Achieving a wide variation generally requires a very large FIFO queue, a requirement which leads to a very expensive system. Second, this method of the prior art generally requires additional encoding of the data so that the data can be stored in the FIFO queue, a requirement which also leads to a more complex and more extensive system. In contrast with this limitation, the present invention is able to transmit varying data rates without large amounts of queueing of data or special encoding of data for switching.

Objects of the Invention

Therefore, it is an object of the invention to provide an improved method for routing data through a distributed switching system, while preserving its appropriate clocking signals.

It is a second object of the invention to provide an improved device for routing data through a distributed switching system, while preserving its appropriate clocking signals.

These and other objects of the present invention will become clear after an examination of the drawings, the description, and the claims herein.

SUMMARY OF THE INVENTION

User clock and data signals are sampled at a rate much greater than they carry information. The sampling information is then routed through a distributed switching system, from source to destination, instead of the user clock and data signals. Because the sampling rate is so much greater than the original signal rate, the original signal can be reconstructed at the destination without unacceptable amounts of distortion. Asynchronous communication is made possible by simple reconstruction of the original signal. Synchronous communication is made possible by multiplexing the clock and data signals onto a single communication link, and demultiplexing clock and data at the destination. A third form of communication, called "isochronous", is made possible by routing data which is clocked by the global system clock signal.

BRIEF DESCRIPTION OF THE DRAWINGS

FIG. 1 shows a timing diagram for asynchronous communication.

FIGS. 2a-b show timing diagrams for synchronous communication.

FIGS. 3a-b show timing diagrams for isosynchronous communication.

FIG. 4 shows a timing diagram for asynchronous communication, as routed by the present invention.

FIGS. 5a-c show timing diagrams for synchronous communication, as routed by the present invention.

FIG. 6 is a circuit diagram of the encoding and decoding circuitry.

DETAILED DESCRIPTION

As used herein, "asynchronous" communication refers to a method of communication in which data is transmitted without the use of a clock signal. In asynchronous communication, data is sent in single message bytes of a fixed (small) length. Each byte must be preceded by a start bit and followed by a stop bit. Because there is no clock signal, the start and stop bits are needed to indicate the beginning and end of a message byte. Also because there is no clock signal, no data can be sent on the line other than within a message byte. This method is well-known in the art, as shown by common use of the RS-232 standard protocol.

As used herein, "synchronous" communication refers to a method of communication in which a clock signal and a data signal are transmitted in parallel, and the data is sampled by reference to the clock clock signal. In synchronous communication, data is sent in long messages in parallel with a clock signal. Because the data is sampled by reference to the clock signal, care must be taken that the two signals are not subject to skewing or other distortion, and that their routing is completely parallel. This method is also well-known in the art, as shown by common use of the RS-334 standard protocol.

FIG. 1 shows a timing diagram for asynchronous communication. A single communication link ("commlink") may carry one data signal 110, which comprises a plurality of message bytes 112. Each message byte itself comprises a start bit 114, a sequence of data bits 116a-c, and one or more stop bits 118. Typically the number of data bits will be quite small, e.g. 8 or 9. It has become quite common in the art to designate one of the data bits, e.g. 116c, as a parity bit. The parity bit is generated by reference to the other data bits 116a-b and serves as a redundancy check on the accurate transmission of the other data bits, as is well-known in the art.

The receiver will generally decode the data signal 110 by sampling it at a standard expected data rate, checking for the start bit to designate the beginning of the message byte 112 and checking for the stop bit to designate the end. Data bits within the message byte can be duly recorded.

FIGS. 2a-b show timing diagrams for synchronous communication. Two commlinks are used to carry a data signal 210 and a clock signal 212. The data signal comprises a plurality of message bits 214a-b, while the clock signal comprises a periodic succession of clock transitions 216a-b.

The receiver will generally decode the data signal 210 by sampling it with reference to the clock signal 212. Each time a clock transition 216 is detected, a message bit 214 can be duly recorded.

FIGS. 3a-b show timing diagrams for a third form of communication, called "isosynchronous" communication. In a distributed switching system, a single global clock signal ("GCS") 310, which is uniform throughout the system, is generated and forwarded to each access port. Thus, the user data signal 312 can be routed from source to destination without the need for routing an independent clock signal, because the GCS is identical at both the source and at the destination. This method of communication is otherwise just like synchronous communication.

FIG. 4 shows a timing diagram for asynchronous communication, as routed by the present invention. As used herein, "massive sampling" is sampling of a signal with reference to a clock signal of much greater frequency. The user data signal 110 (shown in FIG. 1) is massively sampled with reference to the frequency of the GCS 310, generating a routed data signal 410, as described below. The routed data signal contains all the data found in the user data signal, but because sampling occurs with reference to the GCS, some distortion will have been introduced. For example, the user data bit 116a is encoded by a routed data bit 416a, distorted because the initial edge-transition 418a for the routed data bit must coincide with an edge-transition 420a for the GCS.

In a preferred embodiment of the invention, the GCS will have a frequency of about 192 KHz, about 10-20 times that of the data signal. Some distortion is introduced any time a signal is sampled with reference to a clock signal, but when the data signal is sampled at this high rate, only minimal distortion occurs. Thus, if the frequency ratio between the GCS and the data signal is 10:1, there will be no more than 10% distortion in the reconstructed signal. According to EIA recommended standard RS-363, this is not an unacceptable amount of distortion.

FIGS. 5a-c show timing diagrams for synchronous communication, as routed by the present invention. Routing of the user data signal 210 and clock signal 212 (both shown in FIG. 2) is more complicated because only one signal can be transmitted on a commlink at a time. The two signals must be multiplexed into a single signal which can be decoded at the destination.

Accordingly, both the user data signal 210 and the user clock signal 212 are massively sampled with reference to the GCS 310, generating a routed data signal 510 and a routed clock signal 512. These routed signals have the minimal distortion which was noted for the asynchronous routed data signal 410. The two signals are combined by inserting, into the routed clock signal, the appropriate message bit 214 from the data signal, to create an encoded signal 514 as described below. For each period of the routed clock signal, an encoder (disclosed with reference to FIG. 6) replaces the second GCS clock pulse of that period with the appropriate message bit, generating the routed combined signal 514. This signal is decoded at the destination.

Where two user data signals 210 share a common user clock signal 212, they may be combined by replacing the second and third GCS 310 clock pulses with appropriate message bits, to generate, the routed combined signal 514. This is easily generalized to three or more data signals, and is limited only by the width of the user clock signal relative to the GCS. In an embodiment where there are ten GCS clock pulses per user clock pulse, up to eight user data signals may be combined in this manner. Two GCS clock pulses per user clock pulse are necessarily reserved to define the edge-transition for the user clock signal.

FIG. 6 is a circuit diagram of the encoding and decoding circuitry. The user data signal 210 ("UD") and user clock signal 212 ("UC") are encoded with reference to the GCS 310 to create a routed combined signal 514 ("ES"). ES is decoded at the destination to create a received data signal 610 ("RD") and a received clock signal 612 ("RC").

A routed data signal 510 ("SD") is created by sampling UD 210 with the GCS 310. The routed clock signal 512 ("SC") is created by sampling UC 212 with reference to the GCS 310. To create ES 514, SD and SC are passed through a multiplexer 614, with the select line 616 normally set to select SC. A one-shot GCS clock pulse control is used to select SD on the second GCS clock pulse of each period of SD.

The one-shot control for the select line 616 is created by sampling each UC 212 clock pulse relative to GCS 310, and digital by recognizing the second sample. A latch 618 samples UC relative to the GCS and outputs the sampled clock on line 620. A second latch 622 samples line 620 and outputs the delayed sampled clock on line 624. An AND gate 626 forms the logical "AND" of the sampled clock and the delayed sampled clock, and outputs its result on line 628. The output of the AND gate is delayed by a delay latch 630 to create a one-shot control on line 632 for the select line 616.

The digital one-shot 634 digitally recognizes the second sample (relative to GCS 310) of each UC 212 clock pulse. Because each UC clock pulse begins with a low-to-high edge, the GCS sample must show a single low-voltage period followed by one or more high-voltage periods. The delay latch 630 assures that the one-shot select for the multiplexer is delayed past the rising edge of the UC clock.

A one-bit mode-switch signal input from terminal 640 ("AM") distinguishes asynchronous encoding from synchronous encoding. AM and the digital one-shot signal on line 632 are input to an OR gate 642, and the output presented on the select line 616. This guarantees that sampled data is output as ES 514 when operating in asynchronous mode.

UD 210 is sampled by a latch 634 to produce sampled data on line 636, and the sampled data is delayed by a delay latch 638 to produce delayed sampled data on line 510. The delayed sampled data on line 510 is input to the multiplexer 614 and selected only when the digital one-shot signal on the select line 616 is triggered. Thus, the second GCS 310 clock pulse of each UC 212 clock period is replaced with UD.

RC 610 and RD 612 must be separately extracted from ES 514 as shown below. RC is created by "filling in" the second GCS 310 clock pulse of each UC 212 clock period. As RC is created, RD is created by sampling ES relative to RC. RC and RD are approximate versions of UC and UD, with only minimal distortion, as noted with in the disclosure with respect to FIGS. 1-5.

A latch 650 samples ES 514 relative to GCS 310, and outputs a sampled signal on a line 652. Another latch 654 delays this sampled signal and outputs a delayed sampled signal 656. An OR gate 658 forms the logical "OR" of the sampled signal and the delayed sampled signal, and outputs its result on line 660. The output of the AND gate is delayed by a delay latch 662 and output on line 664. Finally, a latch 666 is used to sample ES relative to RC and provides an output on line 668.

The assembly 670 "fills in the hole" formed by the data value which was encoded into ES 514. Because each UC 610 clock pulse begins with a positive-voltage value and has at least one positive-voltage value following the data value, the logical "OR" of ES samples (relative to GCS 310) will smooth away any digital notch introduced by the data value. The delay latch 662 assures that the filled-in UC clock signal is aligned with the actual data value.

AM 640 and line 664 are input to an OR gate 672 to output RC 610. AM is also input as the select line to a multiplexer 674, to select between ES 514 and line 668, to output RD 612. Thus, when operating in asynchronous mode, the received data (RD) 610 is simply ES sampled with reference to GCS 310, and the received clock (RC) 612 is disabled. AM can be set when the transmitted user clock signal fails to show any transitions for a predetermined period of time, as is well-known in the art.

While a presently preferred embodiment has been disclosed, many variations are possible which remain within the scope of the present invention.

We claim:

1. In a distributed data-over-voice communication system with a global system clock, said global system clock having a data rate substantially greater than a transmission rate of asynchronous data signals in said system, a method of routing said data signals from a source device to a destination device, comprising the steps of
   sampling said asynchronous data signals with reference to said global system clock to generate sampling data signals;
   routing said sampling data signals from said source device to said destination device; and
   decoding said sampling data signals with reference to said global system clock to reconstruct said asynchronous data signals by said destination device.

2. In a distributed switching system with a global system clock, a method of routing synchronous clock signals, having a plurality of timing periods, and data signals, having a plurality of data bits each corresponding to a timing period of said clock signals, from a source device to a destination device, comprising the steps of:
   (a) sampling said synchronous clock signals with reference to said global system clock to generate sampling clock signals, each timing period of which comprises a plurality of global system clock pulses;
   (b) for each timing period of said sampling clock signals, altering a later global system clock pulse after the clock transition to equal the corresponding data bit of said data signals;
   (c) routing said altered sampling clock signals from said source device to said destination device; and
   (d) decoding said sampling clock signals with reference to said global system clock to reconstruct said synchronous clock signals and data signals by said destination device.

3. In a distributed data-over-voice communication system with a global system clock, said global system clock having a data rate substantially greater than a transmission rate of asynchronous data signals in said system, a device for routing said data signals from a source device to a destination device, comprising
   means for sampling said asynchronous data signals with reference to said global system clock to generate sampling data signals;
   means for routing said sampling data signals from said source device to said destination device; and
   means for decoding said sampling data signals with reference to said global system to reconstruct said asynchronous data signals by said destination device.

4. In a distributed switching system with a global system clock, a device for routing synchronous clock signals, having a plurality of timing periods, and data signals, having a plurality of data bits each corresponding to a timing period of said clock signals, from a source device to a destination device, comprising (a) means for sampling said synchronous clock signals with reference to said global system clock to generate sampling clock signals, each timing period of which comprises a plurality of global system clock pulses;
(b) means for altering a later global system clock pulse after the clock transition to equal the corresponding data bit of said data signals, for each timing period of said sampling clock signals;
(c) means for routing said altered sampling clock signals from said source device to said destination device; and
(d) means for decoding said sampling clock signals with reference to said global system clock to reconstruct said synchronous clock signals and data signals by said destination device.

* * * * *